United States Patent [19]
Merz et al.

[11] Patent Number: 4,995,930
[45] Date of Patent: Feb. 26, 1991

[54] PROCESS FOR THE PRODUCTION OF A FILM COMBINATION

[75] Inventors: Winfried Merz, Ebermannstadt; Theo Schmidt, Forchheim, both of Fed. Rep. of Germany

[73] Assignee: Lever Brothers Company, New York, N.Y.

[21] Appl. No.: 874,855

[22] Filed: Jun. 16, 1986

[30] Foreign Application Priority Data

Jun. 14, 1985 [DE] Fed. Rep. of Germany ....... 3521374

[51] Int. Cl.⁵ ............................................. B32B 31/00
[52] U.S. Cl. .................................... 156/209; 156/219; 156/220; 156/222; 156/244.18; 156/244.21; 156/244.24; 156/253; 156/282; 156/285

[58] Field of Search .............. 156/196, 199, 209, 219, 156/220, 221-222, 244.11, 244.18, 244.21, 244.24, 252-253, 282, 285-287; 264/504, 555

[56] References Cited

U.S. PATENT DOCUMENTS

| | | | |
|---|---|---|---|
| 2,068,456 | 1/1937 | Hooper | 156/253 |
| 3,165,432 | 1/1965 | Plaskett | 156/285 |
| 3,878,014 | 4/1975 | Melead | 156/285 |
| 4,317,792 | 3/1982 | Raley | 264/504 |

*Primary Examiner*—Merrell C. Cashion
*Attorney, Agent, or Firm*—Cushman, Darby & Cushman

[57] ABSTRACT

A process for the production of a film combination consisting of a perforated plastic film and a fibrous material, which are laminated together by means of the pneumatic vacuum used to perforate the film when it is in a thermoplastic condition.

1 Claim, 1 Drawing Sheet

PROCESS FOR THE PRODUCTION OF A FILM COMBINATION

BACKGROUND OF THE INVENTION

The invention relates to a process for the production of a film combination including a plastic film which is perforated and then cooled on a sievelike surface under the influence of a pneumatic vacuum while in a thermoplastic condition—preferably on leaving an extruder die as well as to a film combination produced by this process.

In view of their surface properties, such perforated plastic films do not produce satisfactory results, particularly when they are used to back disposable diapers, because they feel cold and smooth and do not have the pleasant properties of textile diapers. It would be simple to cover the perforated film loosely with a fibrous material, but this is an extremely laborious and thus costly process. The fibrous material also has to have some degree of tear strength, as it otherwise tears in the course of use and this not only exposes the film itself but also feels extremely unpleasant and can result in pressure marks. Bonding for example by means of gluing or laminating is not a viable option either, because at least some of the holes produced in the film in the perforation process would be blocked up as a result.

SUMMARY OF THE INVENTION

The purpose of the present invention is to determine a process for the production of a film combination that does not place any restrictions on the perforation of the plastic film.

The way the present invention achieves this purpose is to bond the plastic film in a thermoplastic condition with at least one web of fibrous material, through which the pneumatic vacuum acts in order to perforate the film.

Surprisingly enough, roughly the same good overall results are achieved irrespective of whether the fibrous material is located between the plastic film and the sievelike surface or on the surface of the plastic film facing away from the sievelike surface.

If the fibrous material is located between the plastic film and the sievelike surface, the bond between the fibrous material and the plastic film is somewhat stronger and is strengthened further by the projections on the perforated film that press in between the fibers of the fibrous material.

If, on the other hand, the fibrous material is located on the side of the plastic film that faces away from the sievelike surface, the perforation is more uniform and is carried out solely by the sievelike surface.

Since the plastic film is in a thermoplastic condition, its surface bonds particularly strongly to the fibrous material It is of secondary importance what material the fibers are made of, although the intensity of the bond can be varied by choosing the appropriate material. The fibrous material is, however, chosen primarily on the basis of the planned application area.

It has surprisingly enough been determined that the textile nature of the fibrous material is not harmed in any way; on the contrary, it retains its soft, pleasant feel completely.

In addition to this, the plastic film is flawlessly perforated through the fibrous material by the pressure difference, no matter whether the fibrous material is located between the plastic film and the sievelike surface or on the side of the film facing away from the sievelike surface or on both sides.

In the context of the present invention a film combination has the characteristic that the areas of a web of fibrous material and a perforated plastic film that make contact with each other are bonded together directly and completely.

Directly means here that no laminating adhesive or similar agent is used, but that the two layers are bonded together by the adhesive properties of the plastic film in a thermoplastic condition. The combination that is produced has the advantage of the properties of both the perforated plastic film and the fibrous material, the tear strength in particular of the combination being greater than that of the individual components taken together.

The plastic film is perforated and embossed in accordance with the invention, the projections facing either towards or away from the fibrous material.

It is advantageous in the context of the present invention if the plastic film can be made from polyethylene, whilst the fibrous material can be made from plastic, textile or cellulose fibers.

It has proved to be a particular advantage if the fibrous material is a non-woven fabric.

BRIEF DESCRIPTION OF THE INVENTION

The drawing shows two embodiments of the invention:

DETAILED DESCRIPTION OF THE INVENTION

Figure 1:
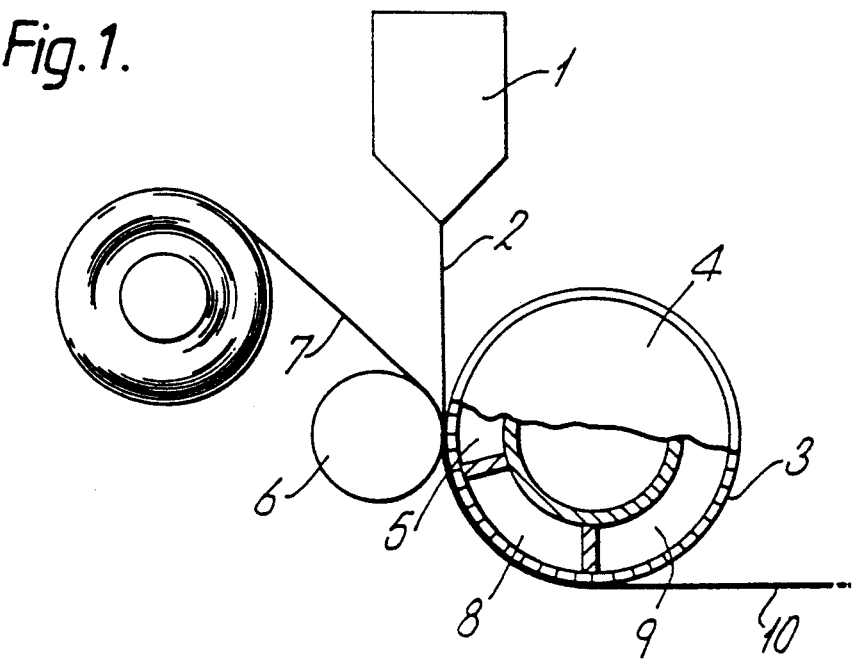
FIG. 1 shows a device for the production of a film combination

In FIG. 1, 1 is an extruder die, from which a plastic film 2 made of polyethylene is fed onto the sievelike surface 3 of a cylinder 4. A vacuum chamber 5, which subjects the plastic film to a pneumatic vacuum, is located inside the cylinder 4 at the point where the plastic film meets the cylinder 4. With the help of a guide roller 6, a fibrous material 7 is fed onto the sievelike surface 3 at the same time as the plastic film. The pneumatic vacuum exerted by vacuum chamber 5 sucks sections of the plastic film into the openings in the sievelike surface, forming projections and perforating the film within these projections. Air is sucked through the fibrous material 7 and presses the fibrous material 7 against the plastic film as well as cooling the plastic film at the same time. The guide roller 6 can help in this pressing operation, but this is not absolutely necessary for the production of a flawless bond between the two layers. Two other vacuum chambers 8 and 9 are located in cylinder 4: vacuum chamber 8 sucks in air to cool the finished film combination 10, whilst the purpose of vacuum chamber 9 is to cool sievelike surface 3.

Figure 2:
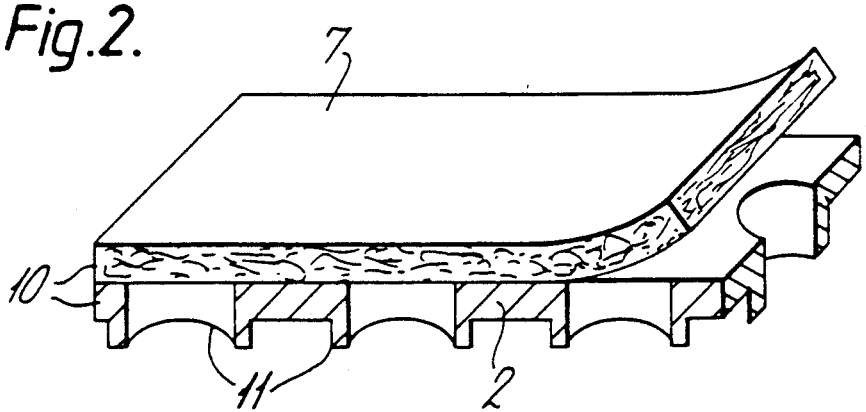
FIG. 2 is a cross section through a film combination with a textile fabric as the fibrous material and FIG. 3 is across section through a further film combination with a fibrous material that is a non-woven fabric.

In the case of the embodiment shown in FIG. 2 the film combination is produced as outlined in relation to FIG. 1. The plastic film 2 has its projections 11 on the side facing away from fibrous material 7. A textile fabric is the fibrous material used here.

Figure 3:
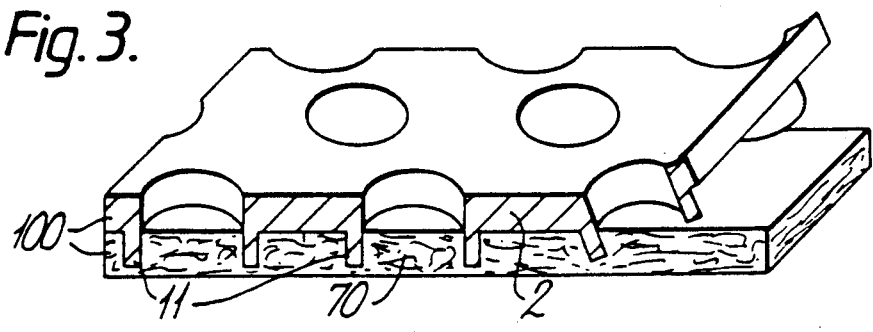

FIG. 3 shows a film combination 100 which was produced by feeding the fibrous material 70 between the plastic film 2 and the sievelike surface 3. The pneumatic vacuum has acted on the plastic film through the fibrous material 70, as a result of which the projections 11 penetrate into the fibrous material 70. A non-woven fabric is a particularly suitable fibrous material for this embodiment of the invention, as such a fabric is relatively easy for the projections to penetrate.

We claim:

1. A process for producing a film combination comprising a web of porous fibrous material having a plastic film bonded thereto, said process comprising extruding a plastic film, feeding the extruded film while it is still in a thermoplastic condition onto a sievelike rotating surface, applying a web of fibrous material against a face of the plastic film that faces away from the sievelike surface as the film is fed onto the rotating surface and applying a pneumatic vacuum to the resulting film web combination through the sievelike rotating surface so that the film is simultaneously perforated and cooled and bonded to the web.

* * * * *